Dec. 16, 1969   M. S. MERRILL   3,483,756
APPARATUS FOR DETECTING WHEEL UNBALANCE
Filed Aug. 1, 1966   4 Sheets-Sheet 1

INVENTOR.
M. STANLEY MERRILL
BY
*Sheridan and Ross*
ATTORNEYS

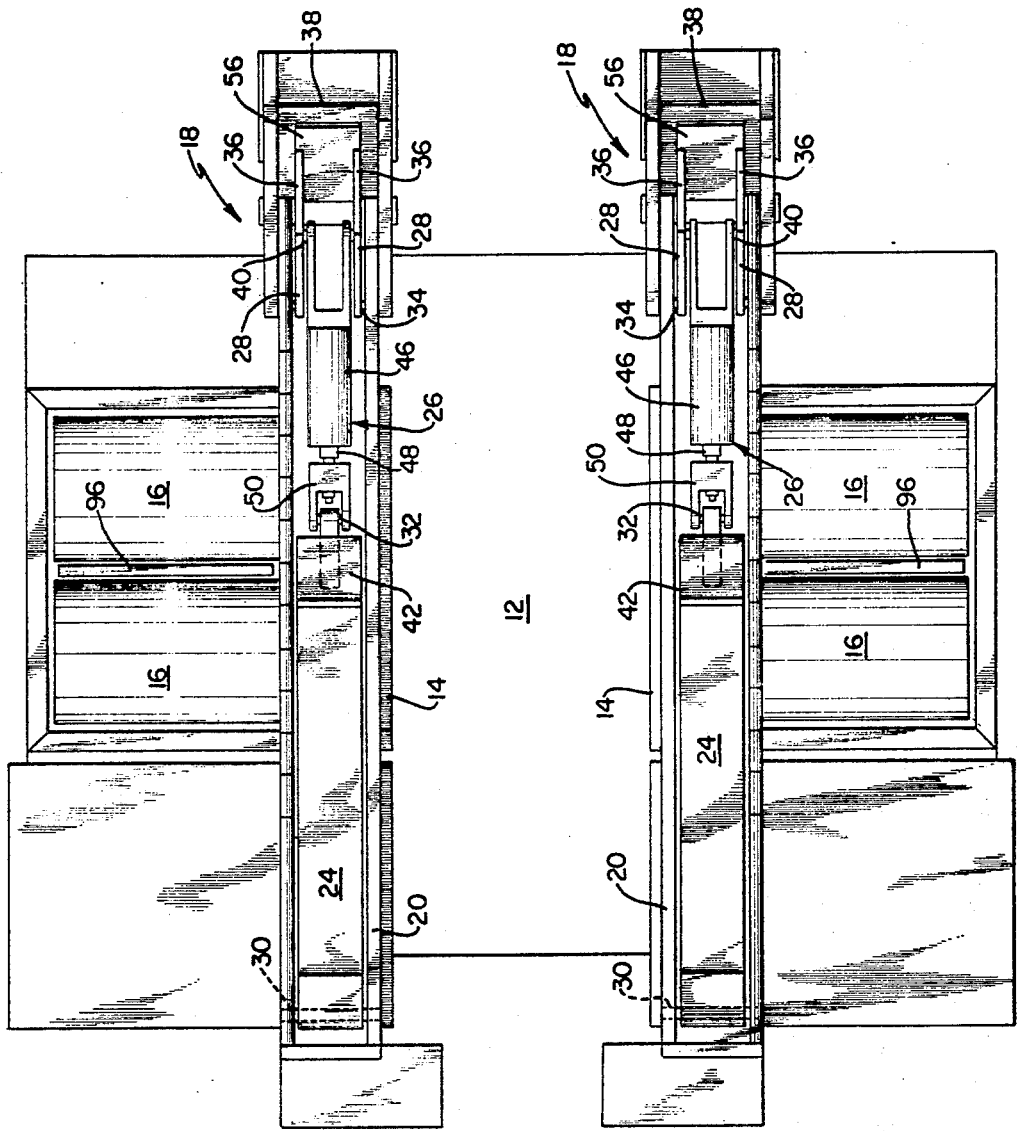

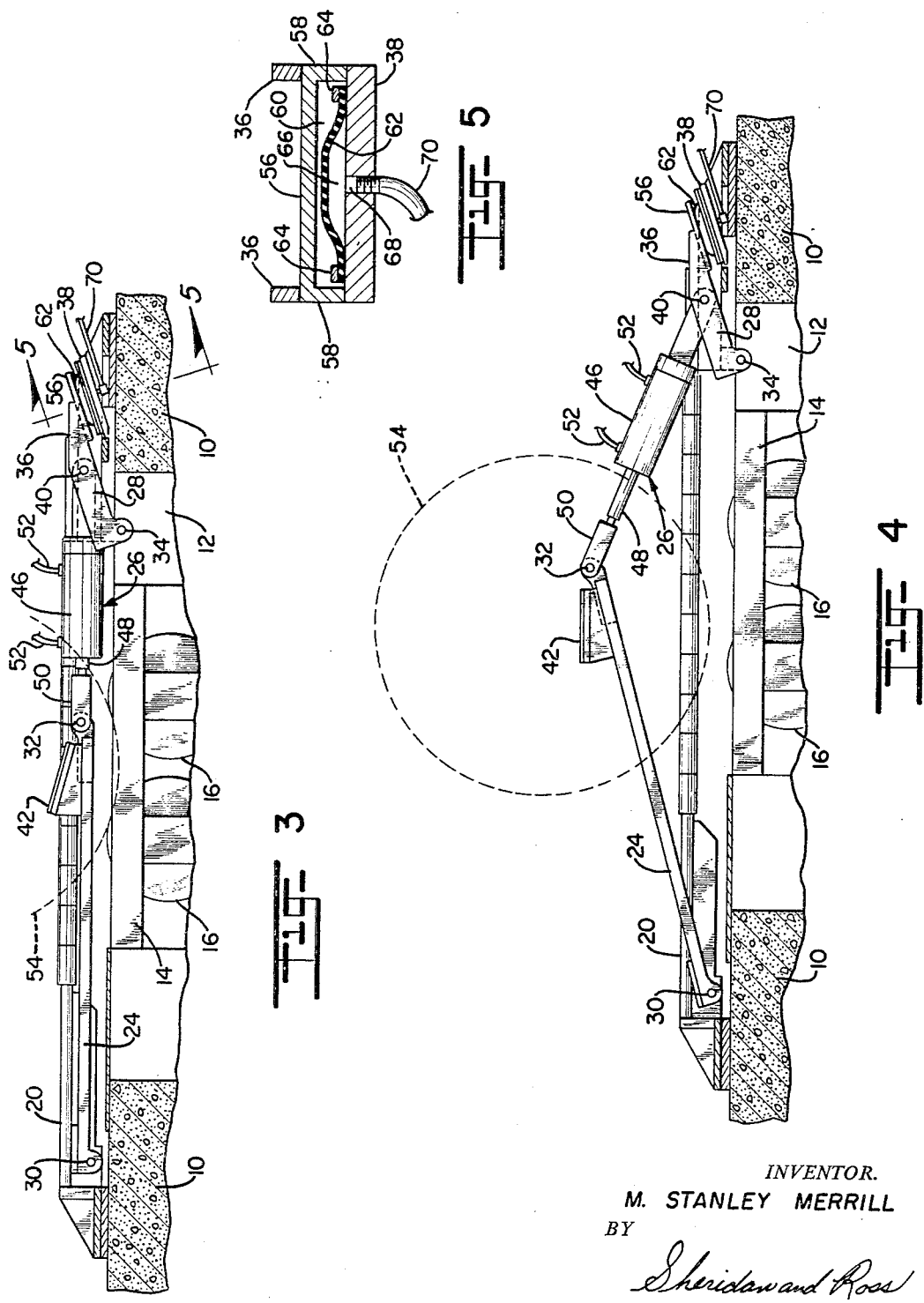

INVENTOR.
M. STANLEY MERRILL
BY
*Sheridan and Ross*
ATTORNEYS 3,483,756
APPARATUS FOR DETECTING WHEEL
UNBALANCE
Marcellus Stanley Merrill, 737 Washington St.,
Denver, Colo. 80203
Filed Aug. 1, 1966, Ser. No. 569,192
Int. Cl. G01m 1/00
U.S. Cl. 73—457                    15 Claims

ABSTRACT OF THE DISCLOSURE

The dynamic unbalance of a pair of vehicle wheels are individually determined by rotating the wheels and supporting them free of any ground contact. Then alternately resiliently supporting one wheel by raising it on a cushion of compressed air while rigidly supporting the other wheel and measuring the dynamic unbalance of the resiliently supported wheel.

BACKGROUND OF THE INVENTION

There are many very satisfactory machines presently in use for detecting and measuring misalignment of vehicle wheels, particularly steerable front wheels, and also the dynamic unbalance of such wheels. The alignment machine is completely different in structure and function from the balancing machine and is located separate from it although both machines are normally located in the same shop. The wheels, including mounted tires, of practically all of the late model automotive vehicles have been balanced at the factory. When a customer has his wheel alignment checked he is usually aware of the balance weights mounted on the wheel rims and assumes that his wheels are still in proper balance. Therefore, he hesitates to spend the charge for a complete balance measurement of each wheel. On the other hand, if he can obtain free or for a very small charge a reading which indicates whether or not one or more of the wheels is sufficiently out of balance to call for further work, he will readily agree to the preliminary check. Then, if there is a serious unbalance he will normally order a complete balancing job.

Many large automotive service centers have diagnostic lines where cars are checked to determine the various items of service work which should be performed to put the vehicle in first class operating condition, including ignition, carburetion, and operation of many of the mechanical moving parts. Some of the instruments indicate exactly what is to be done while others merely indicate that some adjustment or replacement work is in order. While some of the service work may be done "on the line," much of it is performed in other parts of the shop. Hence it is desirable to accomplish the checking work as rapidly as possible in order to minimize the elapsed time and the cost of this portion of the work. Consequently there is a need for an apparatus which will quickly check the amount of dynamic unbalance of the wheels without indicating the exact size and location of the balance weights which must be applied.

The balancing machines presently in use are so constructed and operated that they make all of the measurements necessary for correcting the unbalance. To do this requires more equipment and time than it is desirable to make available for the quick check mentioned above. Therefore, there is a need for a new apparatus and method which are particularly adapted to make only the preliminary check.

DESCRIPTION OF PREFERRED EMBODIMENT

The present invention provides a solution to this problem with apparatus which will give the desired limited information in minimum time and with minimum expenditure of labor. Generally stated, the method comprises rotating a pair of wheels, one at each side of the vehicle, at a rotational speed equivalent to a road speed of the order of 50 to 60 miles per hour, supporting both wheels free of any ground contact at the same time, supporting a first wheel rigidly to damp the vibrating effect of its unbalance, supporting the second wheel resiliently so that it is free to vibrate to the extent caused by its unbalance, and measuring the inertia effect of such unbalance.

As soon as the measurement is made, the second wheel is supported rigidly, the first wheel is supported resiliently, and the unbalance of the first wheel is measured. Rotation of the wheels is then stopped, and the vehicle is once more ground supported. The total operation takes place while both wheels are rotating continuously at approximately the same speed and is completed in about 15 to 30 seconds. Consequently, if the wheels being checked are free running, such as conventional front wheels, they will not slow down more than a few miles per hour and the measurements at the two sides will be properly comparable. Of course, if the wheels are engine driven, they can be rotated at constant speed. The new method avoids the time-consuming routine of setting up one wheel, driving it, and then taking the measurement and stopping the wheel, followed by a separate repetition of these steps with the other wheel. Thus, both the elapsed time and the cost are reduced to a minimum.

In one form which is used to carry out the described method, the apparatus is directly associated with an alignment machine, preferably the machine disclosed and claimed in U.S. Patent No. 3,187,440, to M. S. Merrill et al., issued June 8, 1965. The patented alignment machine measures alignment or misalignment while the vehicle wheels are rotating, using two sets of drive rollers which support the vehicle wheels and impart rotation to them, and these drive rollers are preferably used in conjunction with the new apparatus to furnish the necessary driving force.

In general, the apparatus includes a pair of bearing members, one adapted to be located at each side of the longitudinal axis of the vehicle, each bearing member having a bearing pad adapted to contact the axle or other wheel-support means such as the independent suspension links of most passenger automobiles and support the wheels out of contact with any ground support. The ground support, such as drive rollers, may be lowered to allow the wheels to rotate freely but preferably the bearing members incorporate jack means to raise the vehicle. The jack means may be hydraulic or mechanical to provide a rigid support, but pneumatic means cannot be used because it would permit both rotating wheels to vibrate at all times. For free running wheels drive rolleras are provided and preferably are the drive rollers of the patented alignment machine previously mentioned. When the wheels have been brought up to the desired rotational speed, of the order of 700 to 900 revolutions per minute, the bearing members take over the support of the wheels and they are allowed to rotate freely.

The bearing members in their preferred form are elongate and one end of each is pivotally mounted on a rigid support such as the floor or a supporting frame. The other end of each frame rests on a solid support, which may be another part of the frame, and is free to be raised out of rigid contact therewith. A cavity or space is provided between the free end of the bearing member and the solid support, and an inflatable member such as an air disk is arranged in the space. When the air disk is inflated, it resiliently supports the free end of the bearing member so that is can vibrate with the wheel which it is supporting. The air disks are individually controlled so that one wheel is damped while the other wheel vibrates in response to its unbalance.

In order to determine the amount of the unbalance, an inertia-pickup-transducer is mounted on the free end of each bearing member and is electrically connected to a meter which measures the inertia effect of the oscillating movement of its transducer. Prefereably the meter is of the type which will retain an indication of the maximum inertia effect until cancelled. Switch means is provided in the circuitry so that only the meter associated with the freely vibrating wheel is actuated to receive signals. The meter scale may be in any form but preferably is marked in units indicating the number of ounces of unbalance at the wheel rim. The amount of unbalance which calls for correction varies with the size and weight of the wheel. Usually an unbalance of more than one ounce on a small wheel will cause noticeable tire wear if not corrected and will usually cause wheel shimmy at high speeds.

Various other advantages and features of novelty will become apparent as the description proceeds in conjunction with the accompanying drawings, in which:

FIGURE 2 is a plan view of the apparatus, some parts omitted;

FIGURE 3 is a side elevational view, partly in section, showing one of the bearing members in its inoperative position;

FIGURE 4 is a view similar to FIGURE 3, showing the bearing member in its operative position;

FIGURE 5 is a sectional view taken on line 5-5 of FIGURE 3 showing the arrangement of the air disk;

Figure 1:
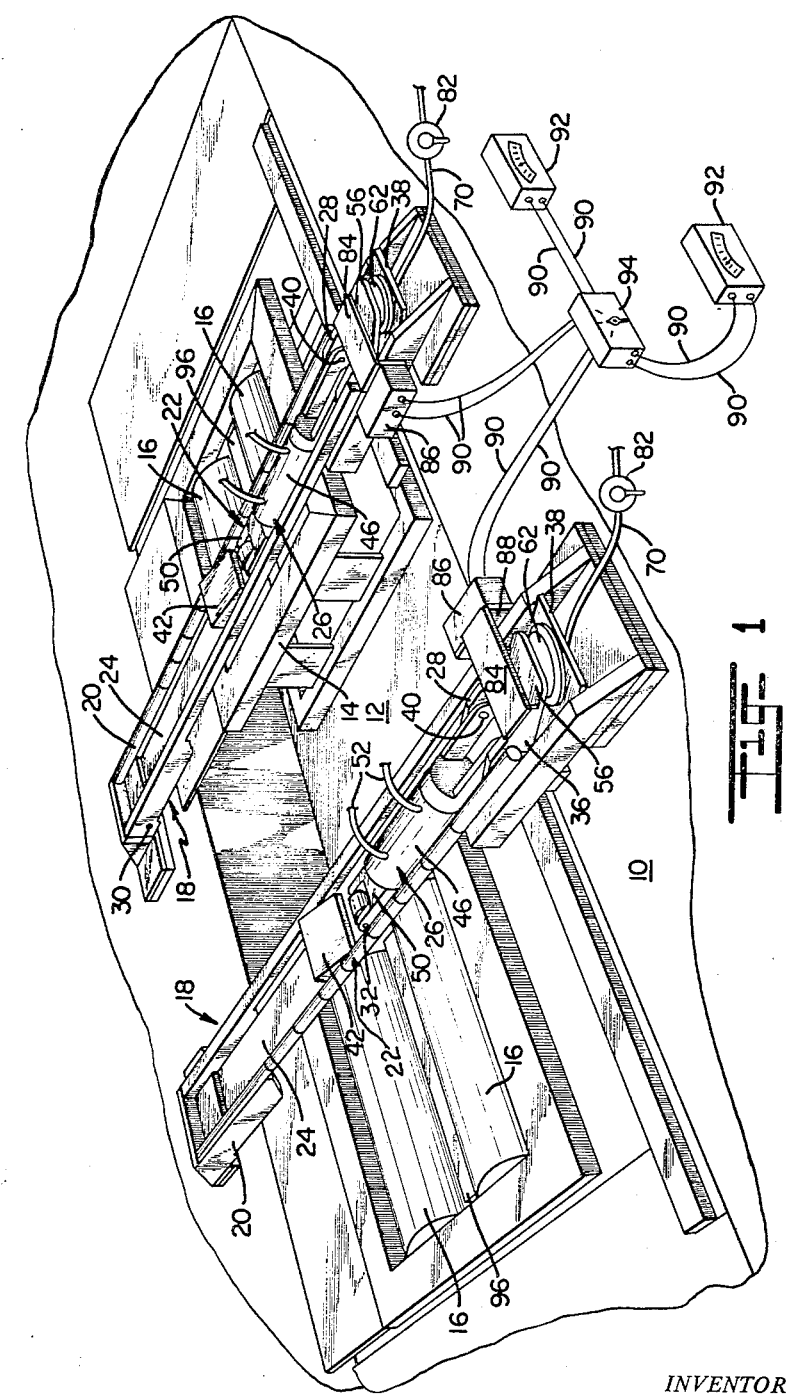
FIGURE 1 is a perspective view of a preferred form of apparatus embodying the invention.

The complete apparatus in one form is generally shown in FIGURES 1 and 2 where floor 10 of a service center is provided with a pit 12 in which are mounted the two components 14 of an alignment machine. Each alignment component is provided with a pair of rotatable drive rollers 16 which support a pair of wheels of a vehicle and also serve to cause them to rotate during the aligning operation, all of which is outlined in detail in the patent to Merrill et al. No. 3,187,440. The two substantially identical components 18 of the balance checking apparatus are mounted at the floor level above the drive rollers and adjacent their inner ends.

Each balance component comprises an elongate open frame 20 fixedly mounted on the floor at each side of the pit. The bearing member 22 includes a fixed length 24, avariable length link 26, and a lever 28, better seen in FIGURE 3. Link 24 is pivotally connected to the frame at 30 and to link 26 at 32. Lever 28 is pivotally connected by a first end to the frame at 34 and has a free end 36 generally vertically movable with respect to base member 38 which is in the form of a plate welded between end portions of the frame. Link 26 in turn is pivotally connected at 40 to an intermediate portion of lever 28. A bearing pad 42 is fixedly mounted to link 24 adjacent to its pivotal connection 32 and is adapted to contact and support an axle or other wheel-support means 44 as show in FIGURE 6.

The variable length link 26 includes a cylinder 46, a piston not shown, and a piston rod 48 having a yoke 50 to complete the pivotal connection 32. Conduits 52, communicating with the ends of the cylinder, lead to a conventional reversible source of hydraulic fluid under pressure. As can be seen in FIGURE 3, pivot 30 is below a horizontal line passing through pivots 32 and 40. Consequently, when pressure is applied to cylinder 46 to extend rod 48, the reaction at pivots 30 and 40 results in raising links 24 and 26 to the position shown in FIGURE 4. Bearing pad 42 contacts the wheel-support 44 and raises wheel 54 clear of drive roller 16 so that it is free to rotate.

When the apparatus is in the position of FIGURE 4 the wheel 54 is solidly or rigidly supported so that the unbalanced weight will not cause it to vibrate appreciably. This resutls from the fact that link 24 is rigidly supported at 30, link 26 is rigid because the hydraulic fluid is incompressible and the link is rigidly supported at 40 on lever 28 which in turn is rigidly supported at one end by the frame at 34 and at the other end by contact with the base member 38. This last contact is illustrated in FIGURE 5, where it will be seen that free end 36 consists of pair of arms to which is welded a flat plate 56 having depending flanges 58 which seat directly on marginal portions of base member 38. Consequently base member 38 actually constitutes the rigid suppport for the one end of the bearing member. While flanges 58 are shown as being attached to plate 56, they will function in the same way if they are fastened to plate 38 instead. If desired, they may be replaced by adjustable stop members secured to either of the plates. In any event, they serve to provide a cavity or space 60 between the two plates.

A diaphragm or air disk 62 is mounted in this space and is secured to plate 38 by a hold down ring 64 to produce sealing engagement with the plate and define an expansion chamber 66 which communicates through aperture 68 in the plate with conduit 70 leading to a source of air under pressure. When the air disk is inflated it raises plate 56 so that flanges 58 no longer are in contact with plate 38, and the load of the wheel is now yieldingly or resiliently carried by the air disk so that wheel 54 is free to vibrate up and down in response to the rotating unbalance. As will be understood from the previous discussion, only one air disk is inflated at a time so that the opposite wheel is rigidly supported and its principal vibrations, at the frequency of rotation of the wheel, are effectively damped. Any higher frequencies involve minor amounts of energy and have practically no effect even when transferred to the other side of the vehicle. In any event they can be readily dealt with as explained subsequently.

Figure 7:
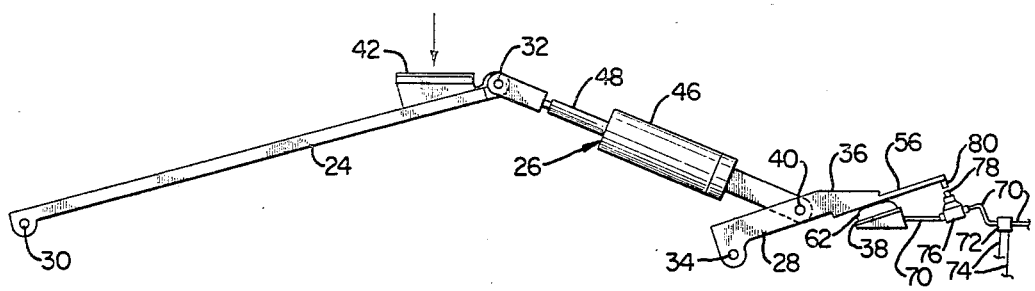
FIGURE 7 is a schematic view of a part of a bearing member showing a weight equalizing system.

The action of the air disk is diagrammatically illustrated in FIGURE 7. When the disk is inflated, it contacts plate 56 and raises it far enough so that its movement under vibration will not cause it to contact plate 38 through flangs 58. When wheel 54 vibrates, it reciprocates vertically and applies repeated forces to bearing pad 42. These forces are in turn applied to lever 28 and its free end 36 vibrates in a vertical plane, being yieldingly or resiliently supported by the inflated air disk 62. Since the weight of vehicles varies considerably and it is desired to raise free end 36 to a predetermined distance above plate 38, which may be considered as a neutral point when the wheel is not rotating, it is necessary to provide special means to control the air supply. It a control valve is merely opened allowing air to enter at full supply pressure which has been calculated to support a wheel bearing a given load with free end 36 at the neutral point, then 36 will stand higher or lower with different weights because the area of the air disk is constant.

This difficulty is overcome by the arrangement shown at the right end of FIGURE 7. When the apparatus is actuated to perform a checking operation, the master valve 72 is opened by a control signal through conductors 74. Full pressure is then allowed to reach secondary valve 76, such pressure being adequate for the heaviest loads. Valve 76 is provided with a spring-biased control member 78, here shown as an axially movable shaft. Plate 56 is provided with an actuating shaft 80 which is axially aligned with shaft 78. At the moment when master valve 72 is opened, lever 28 is in its lowermost position and actuating shaft 80 has depressed shaft 78 to its lowest position which opens valve 76 and allows air at full pressure to pass through conduit 70 and inflate air disk 62. This in turn raises lever 28 and its plate 56 until the "neutral" point is reached. At this time shaft 80 disengages shaft 78 and valve 76 is closed so that no additional air will enter the air disk. While not essential, it is preferable to close master valve 72 at this point so that occasional contact of shaft 80 with shaft 78 will not "pump up" the air disk beyond the desired amount.

Control and measuring means in their simpler form are illustrated in FIGURE 1. Manual valves 82 are shown for controlling the air supply through conduits 70. Each free end 36 of a lever 28 is provided with an angle shaped bracket 84 preferably welded thereto. An inertia-pickup-transducer 86 is fixedly mounted to the depending leg 88 of each bracket so that it will vibrate with the same frequency as the wheel 54 and the same amplitude as the free end 36. Thus the reversals of movement will produce signals indicative of the unbalance of the wheel. These signals are transmitted through conductors 90 to meters 92 which then display readings indicating the amount of unbalance. Their scales may be in ounces and they may be of a type which will retain the maximum signal indication until cancelled. Since various sizes and weights of wheels have different critical unbalances, the scale may carry specific reference marks for different categories. A simple manual three-way switch control box 94 is preferably provided so that both circuits may be opened or either circuit closed alternately.

Briefly, in carrying out the method described above, rollers 16 are actuated to drive wheels 54 up to a speed of about 700 to 900 revolutions per minute. The jack means consisting of links 24 and 26 is then actuated to raise both wheels free of the rollers for coasting rotation. At this time the vibrations of both wheels are being damped. One valve 82, on the right side for instance, is now opened to supply air to air disk 62 and raise the right wheel to a position where it can vibrate freely. After a pause of about two or three seconds to prevent transfer to the meter of any signal resulting from the effect of sudden expansion of the air disk, the switch on control box 94 is moved to close the circuit to the right hand meter. As soon as a maximum signal has been observed or recorded, again, about two or three seconds, the switch is moved to "off" to open the circuit, the air disk is deflated so that the wheel is again damped, and the procedure is repeated with the left wheel. As soon as the second wheel has been checked, a pair of brake bars 96, located between the drive rollers 16 are raised to contact the wheels and bring them to a stop. Each step of the operation takes about two or three seconds and the entire operation can be completed in 15 to 30 seconds. In this short time the wheels do not slow down more than a few miles per hour, and consequently the readings for both wheels are consistent and comparable.

When the test is applied to engine driven wheels the same procedure is followed with the exception that it is not necessary to bring the wheels up to speed by means of drive rollers 16, and the wheel speed can be maintained constant by operation of the vehicle engine.

Figure 8:
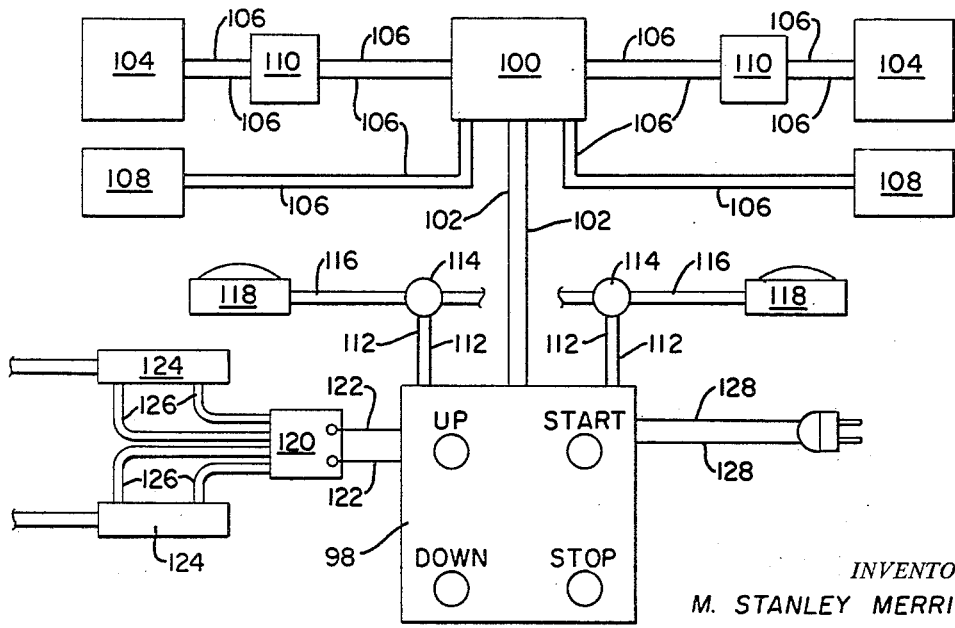
FIGURE 8 is a diagrammatic view of the complete measuring system including an automatic control device.

Substantially completely automatic operation can be achieved by use of the control system diagrammatically illustrated in FIGURE 8. A master control unit, illustrated at 98, is programmed to carry through the various steps of the operation described above. Switch control box 100 is electrically connected to it by conductors 102. Inertia-pickup-transducers 104 are electrically connected through the switch control box 100 by conductors 106 to meters 108. In order to remove any traces of high frequency transfer effects from the damped wheel to the free wheel filters 110 are incorporated in the circuit and are designed to pass only frequencies below 20 cycles per second.

Conductors 112 connect control valves 114 to the control unit 98 and these valves control the air supply through conduits 116 to air disks 118. Hydraulic supply source 120 is connected to control unit 98 by conductors 122 and is connected to the jack cylinders 124 by conduits 126. Electric power is received through conductors 128. The jack cylinders can be operated automatically, but as shown they are subject to manual control.

To commence the total operation, the operator presses the "UP" button. This actuates the jacks to raise the rotating wheels to a free position but with vibration damped in both wheels. He then presses the "START" button which actuates a constant speed timer, which in turn drives a fully programmed switch shaft. In preferred form, the switch shaft is timed to allow two to three seconds for each step in the operation including the time delay. The sequence of steps is (a) open valve 114 right side to inflate air disk, (b) delay two to three seconds, (c) actuate switch 100 to connect transducer 104 right side to meter 108 right side, (d) actuate switch 100 to disconnect transducer 104, (e) actuate valve 114 to deflate air disk, (f) actuate valve 114 to left side to inflate air disk, (g) delay, (h) actuate switch 100 to connect transducer 104 left side to meter 108 left side, (i) actuate switch 100 to disconnect transducer, (j) actuate valve 114 to deflate air disk. When the sequence is completed, the timer stops. The operator may press the "STOP" button at any time to interrupt the test and bring the programmed switch shaft back to starting position and erase the meter readings. If the sequence is not interrupted, he finally presses the "STOP" button to erase the meter readings after they have been noted. He then presses the "DOWN" button to lower the wheels back to ground support and the test is completed.

Although the following has not been particularly emphasized heretofore, it is to be noted that the heretofore described apparatus may be modified slightly for obtaining beneficial results as far as determining the amount of unbalance of one of a pair vehicle wheels wherein one of said wheels is rotating and the other of said wheels is stationary, i.e., not rotating. The modified method referred to herein of determining the unbalance of one of a pair of vehicle wheels mounted at opposite sides of the vehicle's longitudinal axis, comprises applying driving force to one of said wheels to cause it to rotate at a high speed, supporting said wheels wherein at least said rotating wheel is resiliently supported to permit it to vibrate freely, and measuring through said resilient support for said rotating wheel the maximum inertia effect of the vibration of said rotating wheel. If desired, both of said wheels may be resiliently supported. It has been found that where one of a pair of vehicle wheels as aforedescribed is resiliently supported that the amplitude or maximum inertia effect of vibration of the rotating wheels occurs as the speed of the rotating wheel passes through its critical or resonant speed. It has also been found that supporting of the rotating wheel in this manner results in producing a maximum inertia effect which is not materially affected even though the support for the other (non-rotating) wheel does not lie at the exact nodal point of the system. In other words, although the nodal point frequently will lie intermediate the non-rotating wheel and the support thereof, it is preferred that the nodal point coincide with the position of the support for the non-rotating wheel. Where the nodal point of the system and the point of support for the non-rotating wheel do not coincide, it will be appreciated that where the support for the non-rotating wheel is of the resilient type, an inertia effect through such resilient support can also be measured. As in the case with the inertia effect being measured through the resilient support for the rotating wheel, the inertia effect being transferred through the resilient support for the non-rotating wheel will likewise be directly proportional to the amount of unbalance of the rotating wheel. However, the amplitude of the inertia effect being transmitted through the resilient support for the non-rotating wheel will be much smaller than the amplitude of the inertia effect being transmitted through the resilien support for the rotating wheel. However, as previously indicated, the maximum value of the inertia effect being transmitted through the resilient support for the rotating wheel will be fairly constant for the same amount of unbalance.

Figure 6:
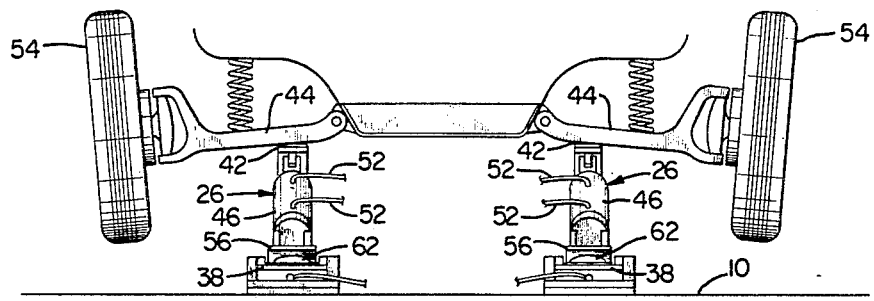
FIGURE 6 is a front elevational view of the apparatus in use supporting both vehicle wheels for rotation.

A modified apparatus as referred to above for determining the unbalance of one of a pair of vehicle wheels mounted at opposite sides of the vehicle's longitudinal axis comprises a pair of bearing members adapted to be located one at each side of the longitudinal axis of the vehicle beneath the wheel-supports and in engagement therewith to retain the wheels in vertically spaced relation to a supporting surface to permit at least one of said wheels to rotate continuously, resilient support means associated with at least said bearing member disposed adjacent the wheel to be rotated and operable to support the wheel to be rotated to permit vibration thereof, and separate inertia-actuated means associated with said resilient support means to sense the amount of unbalance of the wheel to be rotated during rotation thereof. As previously indicated, resilient support means may be associated with both of said bearing members rather than just with the bearing member disposed adjacent the wheel to be rotated. Referring now to FIGURE 6, it will be appreciated that only one of the bearing pads 42 may be resiliently supported with respect to the floor 10 while the other bearing pad may be either resiliently supported or rigidly supported with respect to the floor 10. If the left bearing pad 42 is resiliently supported with respect to the floor 10 while the other bearing pad may be either resiliently supported or rigidly supported with respect to the floor 10. If the left bearing pad 42 is resiliently supported with respect to the floor 10 then the left wheel 54 will be rotated and the right wheel 54 will remain stationary. As the speed of the left rotating wheel 54 decreases and passes through its critical or resonant speed, the amount of inertia effect being transmitted through the resilient support will increase to a maximum at the critical or resonant speed and then decrease as the speed of the rotating wheel further decreases. If both of the wheels 54 were to be rigidly supported with respect to the floor 10, even though only one of the wheels 54 were rotated, it would be impossible to determine the exact critical or resonant speed for the wheel concerned and thus it would be impossible to determine accurately the amount of unbalance for any one or all of a large number of rotating wheels.

It is important that the value of the spring constant of the resilient support such as the diaphragm or disc 62 remain constant throughout the measurement of the amount of wheel unbalance. A somewhat constant value of spring constant for the diaphragm 62 is obtained by restricting the rate at which the compressed gas may flow out of said diaphragm. It will be appreciated that in lieu of the diaphragm or disc 62 a coil spring may be used towards this end. Where the weight being transmitted through the resilient support varies considerably it will be appreciated that a resilient support should be used wherein the value of the spring constant may be easily and quickly changed from one value to another value. This may be effected through the use of a pair of concentrically disposed coil springs each having a different spring constant than the other and in which both of said springs are used for heavy loads, one of said springs being used for light loads and the other of said springs being used for intermediate loads. It will also be appreciated that each of the said concentrically disposed springs may be hydraulically actuated in order that either one or both may be used as desired or required.

In view of the foregoing it will also be appreciated that the modified method and apparatus described herein may be used to determine the exact nodal point of the system. This occurs when the resilient support for the non-rotating wheels is positioned such that no inertia effect is transmitted through the resilient support.

The apparatus described constitutes a significant advance in the art, providing a single purpose system for checking only the amount and not the location of dynamic unbalance in vehicle wheels without the necessity of setting up each wheel separately. It is the only system known which does not require that one wheel be maintained stationary on the ground while the other is rotated and checked. Thus it is capable of performing a complete checking operation in minimum time and at minimum expense.

It will be apparent to those skilled in the art that various changes may be made in the apparatus as disclosed without departing from the spirit of the invention, and it is intended that all such changes shall be embraced within the scope of the following claims.

I claim:
1. Apparatus for individually determining the unbalance of a pair of rotating vehicle wheels mounted at opposite sides of the vehicle's longitudinal axis, comprising: a pair of elongate frames adapted to be located one at each side of the longitudinal axis of the vehicle and substantially parallel to said axis and beneath the wheel-support means connecting the wheels to the vehicle; a bearing member carried by each frame and including a lever having a first end pivotally connected to said frame and a second free end vertically movable about the pivotal connection, and jack means having a first end pivotally connected to said frame and a second end pivotally connected to an intermediate point of said lever, the jack means being provided with a bearing pad to contact the wheel-support means and raise the wheel out of ground contact for continuous rotation; a base member rigidly mounted adjacent the free end of said lever; said lever having means to rigidly contact said base member and damp vibration of its associated wheel resulting from unbalanced rotation; an air disk mounted on said base member in juxtaposition to the free end of said lever and inflatable to raise said free end out of rigid contact with said base member to provide resilient support for said bearing member and its associated rotating wheel to permit vibration resulting from unbalance; and inertia-actuated means to measure the amount of unbalance of the vibrating wheel.

2. Apparatus as claimed in claim 1; said jack means comprising a fixed length link and a variable length link pivotally connected to each other and to said frame and lever; said variable length link being extensible to raise said bearing pad into engagement with said wheel-support means.

3. Apparatus as claimed in claim 1; said measuring means including an inertia-pickup-transducer fixedly mounted on each lever to vibrate therewith and a meter electrically connected to the transducer and adapted to register the inertia effect on the transducer.

4. Apparatus as claimed in claim 1; and control means operable to independently cause inflation of one of said air disks to raise its respective lever out of rigid contact with its base member and permit free vibration of its associated rotating wheel while the other lever remains in rigid contact with its base member and damps the vibration of its associated rotating wheel.

5. Apparatus for individually determining the unbalance of a pair of rotating vehicle wheels mounted at opposite sides of the vehicle's longitudinal axis, comprising: a pair of bearing members adapted to be located one at each side of the longitudinal axis of the vehicle beneath the wheel-supports and in engagement therewith to retain the wheels in vertically spaced relation to a supporting surface to permit said wheels to rotate continuously; a base member for each bearing member adapted to rigidly contact its respective bearing member and damp vibration of its associated wheel resulting from unbalanced rotation; separately operable resilient support means associated with each base member and operable to raise its respective bearing member out of rigid contact with the base member and resiliently support said bearing on said base member to permit vibration of its respective wheel; separate inertia-actuated means to measure the amount of unbalance of each rotating wheel; and control means to successively actuate the resilient support means and the measuring means for a first wheel while the second wheel remains damped, and actuate the resilient support means and the measuring means for the second wheel while the first wheel remains damped; whereby the unbalance of each wheel may be individually and rapidly determined while both wheels are rotating continuously.

6. Apparatus as claimed in claim 5; each bearing member including a bearing pad and jack means to raise and lower the pad into and out of engagement with the wheel-support.

7. Apparatus as claimed in claim 6; and rotatable drive means to support said wheels and drive them at a predetermined rate of rotation; said bearing members being actuatable to raise said wheels out of driven engagement with the drive means for free rotation.

8. Apparatus as claimed in claim 5; the measuring means for each of said wheels including an inertia-pickup-transducer actuated by the vibrations of the rotating wheel which is resiliently supported, and a meter electrically connected to said transducer and adapted to register the maximum inertia effect on said transducer.

9. Apparatus as claimed in claim 8; and a filter in each circuit between the transducer and its meter; said filter passing signals only at frequencies less than 20 cycles per second.

10. Apparatus as claimed in claim 8; said transducer being fixedly mounted on its respective bearing member to vibrate therewith.

11. Apparatus as claimed in claim 8; and electric switch means connected in the circuit of each measuring means to alternately close one circuit and open the other.

12. Apparatus as claimed in claim 8; and a time control device operatively connected to said resilient support means and said measuring means; said device being programmed to successively activate the first resilient support means, provide a time delay, activate the first measuring means, deactivate the first measuring means, deactivate the first resilient support means, activate the second resilient support means, provide a time delay, activate the second measuring means, deactivate the second measuring means, and deactivate the second resilient support means.

13. Apparatus as claimed in claim 12; said device being so programmed that each of the operative steps including the time delays, is accomplished in an interval of the order of two to three seconds.

14. Apparatus for supporting a vehicle-mounted wheel for continuous rotation in a balance checking operation, comprising: a frame to be located at one side of the longitudinal axis of the vehicle and beneath the wheel-support means connecting the wheel to the vehicle; a rigid base member; a bearing member having a first end pivotally connected to the frame and the second end overlying the base member and provided with depending means to rigidly contact the base member and provide a space between the second end and the base member; an inflatable air disk located located in said space and adapted to be inflated to raise said second end out of rigid contact with said base member; said bearing member having means to contact said wheel-support means and retain the wheel in vertically spaced relation to a supporting surface to permit said wheel to rotate continuously; the rigid contact of the second end with the base member serving to damp vibration of the rotating wheel, and the resilient support provided by the inflated air disk permitting the rotating wheel to vibrate freely, and inertia actuated means to measure the amount of unbalance of the rotating wheel.

15. Apparatus as claimed in claim 14; said air disk being provided with an air supply line; a secondary valve in said line provided with a spring-biased control member; said second end having a portion adapted to contact said control member and move it to valve-opening position when said second end is in rigid contact with said base member; and a master valve in said supply line to control the basic air supply; said second end portion being so located with respect to said control member that it is carried out of contact therewith by said second end when the air disk has been inflated to the desired height for resilient support of the rotating wheel.

References Cited

UNITED STATES PATENTS

| | | | |
|---|---|---|---|
| 2,700,892 | 2/1955 | Lowe | 73—457 |
| 2,782,641 | 2/1957 | Allen | 73—457 |
| 2,798,379 | 7/1957 | Merrill | 73—457 |
| 3,164,994 | 1/1965 | Merrill | 73—457 |

JAMES J. GILL, Primary Examiner

HERBERT GOLDSTEIN, Assistant Examiner